(12) United States Patent  
Krane et al.

(10) Patent No.: US 7,584,193 B2
(45) Date of Patent: Sep. 1, 2009

(54) CLIENT-SERVER DATA COMMUNICATION

(75) Inventors: Rolf Krane, Wiesloch (DE); Rudolf Niessen, Rauenberg (DE)

(73) Assignee: SAP AG, Walldorf (DE)

( * ) Notice: Subject to any disclaimer, the term of this patent is extended or adjusted under 35 U.S.C. 154(b) by 339 days.

(21) Appl. No.: 11/015,616

(22) Filed: Dec. 16, 2004

(65) Prior Publication Data

US 2006/0136552 A1 Jun. 22, 2006

(51) Int. Cl.
*G06F 17/30* (2006.01)
(52) U.S. Cl. .............. 707/10; 707/8; 707/9; 707/200; 709/219; 709/203; 719/313
(58) Field of Classification Search .......... 707/103 R, 707/103 X, 104.1, 8, 9, 10, 200; 709/203, 709/219, 200; 719/313
See application file for complete search history.

(56) References Cited

U.S. PATENT DOCUMENTS

| | | | |
|---|---|---|---|
| 5,659,793 A * | 8/1997 | Escobar et al. ........... 715/500.1 |
| 5,845,084 A * | 12/1998 | Cordell et al. ............. 709/234 |
| 5,907,846 A * | 5/1999 | Berner et al. ............ 707/103 R |
| 6,191,786 B1 * | 2/2001 | Eyzaguirre et al. .......... 715/853 |
| 6,330,281 B1 * | 12/2001 | Mann et al. ............ 375/240.12 |
| 6,615,253 B1 * | 9/2003 | Bowman-Amuah ......... 709/219 |
| 2001/0034771 A1 * | 10/2001 | Hutsch et al. ............... 709/217 |
| 2004/0123238 A1 * | 6/2004 | Hefetz et al. ................ 715/513 |

* cited by examiner

*Primary Examiner*—Hosain T Alam
*Assistant Examiner*—Syling Yen
(74) *Attorney, Agent, or Firm*—Finnegan, Henderson, Farabow, Garrett & Dunner L.L.P.

(57) ABSTRACT

Methods and apparatus, including computer program products, using placeholder objects in the communication of structures of data objects. A server can respond to a request for a complete structure of data objects with a partial structure that includes placeholder objects, each having a position in the partial structure, each representing content that is present in the complete structure but omitted in the partial structure. A client can accept the partial structure instead of the complete structure, can transmit a placeholder substitution request to the server identifying a placeholder object, and can receive in response to the request a further structure of data objects to replace the identified placeholder object.

16 Claims, 4 Drawing Sheets

CLIENT-SERVER DATA COMMUNICATION

BACKGROUND

The present invention relates to data processing by digital computer, and more particularly to communication of data objects in a client-server system.

A client-server system typically divides processing and data storage between two separate but linked applications—a client application and a server application. The client application running on the client system present a user interface to the user, enables the user to request data from the server, and presents the requested data to the user. The server application receives data requests from multiple users interacting with multiple client applications. The server application processes the data requests received from multiple clients, and retrieves the requested data. The client-server system can include one or more clients, and the server can be implemented as a centralized server or as one or more distributed servers.

Different types of client-server systems result from different approaches to dividing the processing and data storage between the client and the server. In one type of client-server system, the client application only provides the user interface to the user and all the processing and data storage required for responding to user requested operations is provided by the server application. In this type of client application, the client typically does not store any data required by the client application and all data requests from the client application are transmitted to the server. In an alternative type of client-server application, the client application provides data storage and processing required to respond to the user requested operations, in addition to providing the user interface. In this type of client-server application, data required by the client application is stored at the client and the client can respond to data requests without having to request data from the server.

SUMMARY OF THE INVENTION

The present invention provides methods and apparatus, including computer program products, that implement techniques for the communication of data objects in a client-server system.

In general, in one aspect, the invention provides methods and apparatus, including computer program products implementing techniques for the communication of data objects in a client-server system. The techniques provide a server operable to respond to a request for a complete structure of data objects with a partial structure of data objects. The partial structure differs from the complete structure in that the partial structure includes one or more placeholder objects and omits one or more data objects. Each placeholder object has a position in the partial structure. Each placeholder object represents corresponding placeholder content, where the corresponding placeholder content is content that is present at a position in the complete structure corresponding to the position of the corresponding placeholder object in the partial structure.

Advantageous implementations of the invention include one or more of the following features. The techniques further provide a client operable to accept the partial structure of data objects instead of the complete structure. The client is operable to transmit a placeholder substitution request to the server identifying a placeholder object. The client is also operable to receive in response to the placeholder substitution request a further structure of data objects to replace the identified placeholder object. The server is further operable to respond to a placeholder substitution request identifying a placeholder object with a further structure of data objects to replace the identified placeholder object in the partial structure. The further structure of data objects is partial and contains one or more placeholder objects and omits one or more data objects. The client implements a data object model that defines a data structure for representing the partial structure of data objects, and an interface for operating on the partial structure of data objects. The data objects represent user interface elements, and the data object model is a user interface model. The data object represent data types and the data object model is a data type object model. The data object model is a XML document object model.

In another aspect the invention provides methods and apparatus, implementing techniques for accepting a partial structure of data objects in response to a request for a complete structure of data objects. The partial structure differs from the complete structure in that the partial structure includes one or more placeholder objects and omits one or more data objects. Each placeholder object has a position in the partial structure. Each placeholder object represents corresponding placeholder content, the corresponding placeholder content is content that is present at a position in the complete structure corresponding to the position of the corresponding placeholder object in the partial structure. The techniques further include transmitting to the server a placeholder substitution request identifying a first placeholder object, receiving from the server first placeholder content represented by the first placeholder object, and replacing the first placeholder object in the partial structure with the received first placeholder content. Advantageous implementations of the invention provide first placeholder content that includes one or more placeholder objects.

The invention can be implemented to realize one or more of the following advantages. The use of placeholder objects allows the server to transmit only a proper subset of the data objects requested by the client. Transmitting a proper subset of the requested data objects requires less bandwidth for responding to client request. Transmitting a proper subset of the requested data objects also leads to improved performance as it requires less time than would be required to transmit all the requested data objects. In addition, less storage capacity is required at the client because the client does not have to store all the requested data objects in order to run the client application. The use of placeholder objects allows the server to transmit only a proper subset of structured user interface (UI) elements requested by the client. The use of placeholder objects during the transmission of structured UI elements leads to faster UI response time because the client is only required to receive and display the proper subset of structured UI elements that it receives. One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
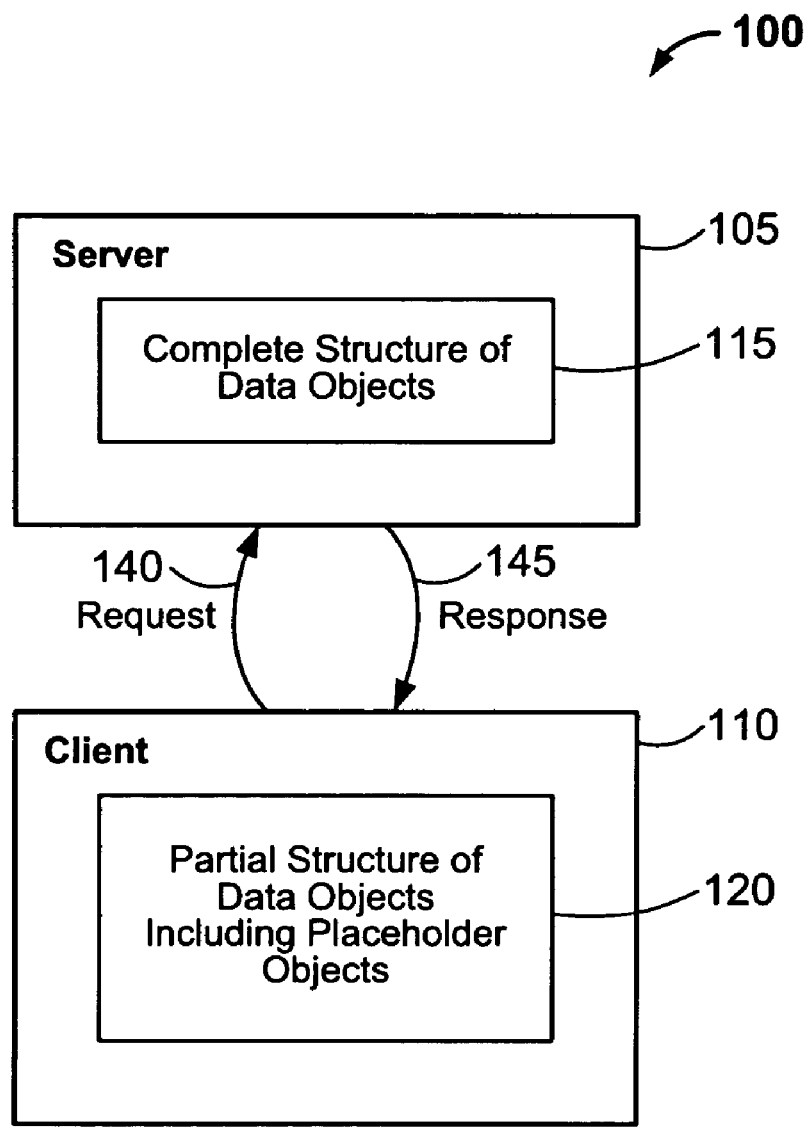
FIG. 1A illustrates a client-server system that uses placeholder objects.

As shown in FIG. 1A, the systems and techniques described here can be implemented in an environment that includes a client-server system 100, where the server 105 and the client 110 communicate structured data that can include placeholder objects. The client 110 requests data objects from the server. The server can respond to the client's request by transmitting to the client a partial structure of data objects 120 instead of the complete structure of data objects 115 requested by the client. The partial structure of data objects 120 includes one or more placeholder objects corresponding to omitted data objects, i.e., data objects that were requested but were not included in the partial structure of data objects 120 transmitted to the client 110. The omitted data objects are in the complete structure of data objects 115. Each placeholder object has a place in the structure of the complete structure of data objects 115 and represents content that generally includes a structure of one or more omitted data objects. (It is sometimes useful to allow the content represented by a placeholder object to be empty, but generally the content will be a structure of one or more data objects.)

To obtain data represented by a placeholder object, the client sends a placeholder substitution request to the server identifying the placeholder object to obtain the content it represents. In response to the placeholder substitution request, the server transmits part or all of the placeholder content represented by the placeholder object to the client. The client replaces the placeholder object in the partial structure of data objects 120 with the content transmitted by the server.

In one implementation, a placeholder object throws an associated placeholder event when it is accessed. The client obtains the placeholder content associated with the accessed placeholder object by dispatching the placeholder event thrown by the accessed placeholder object to the server.

Figure 1B:
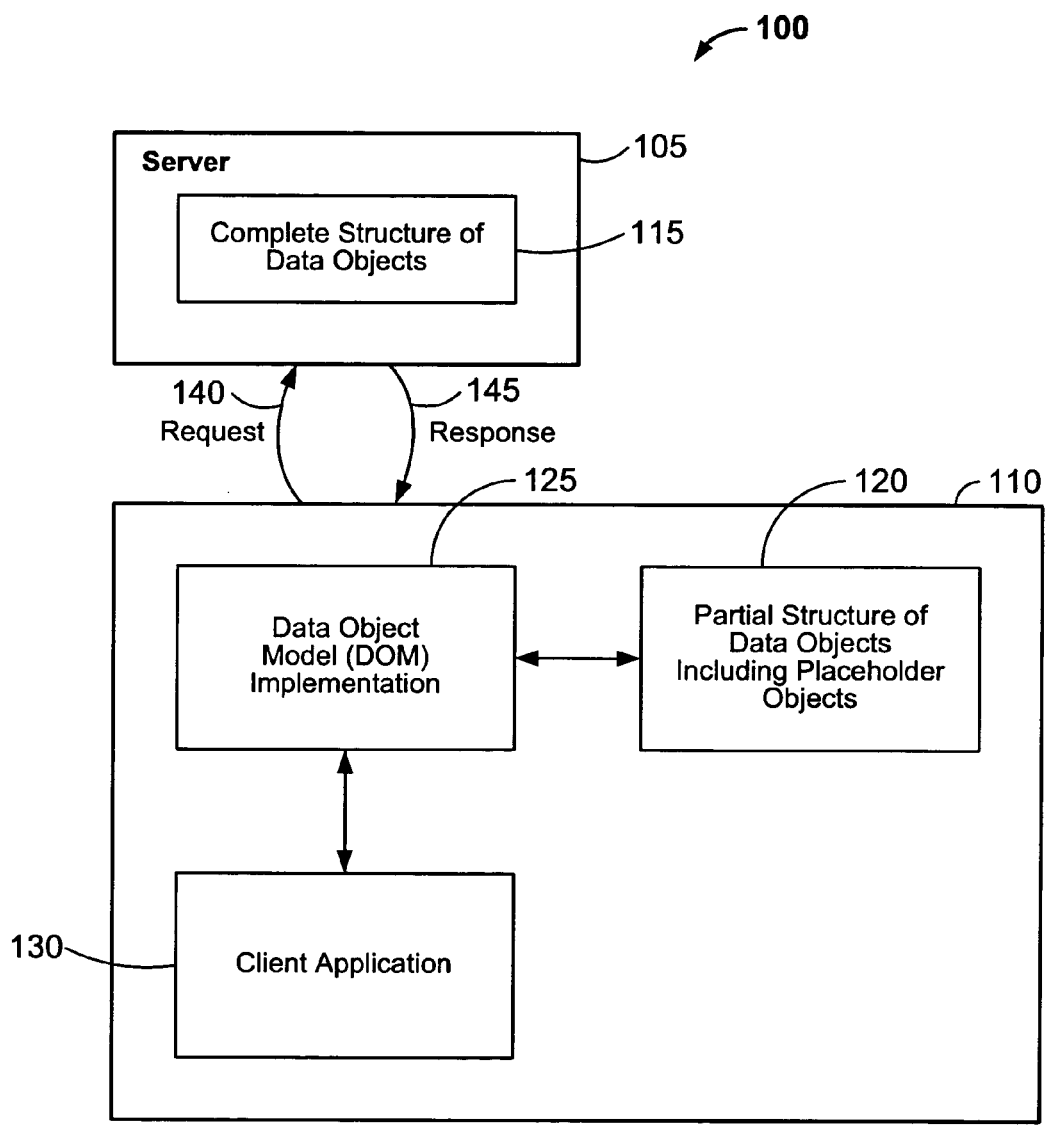
FIG. 1B illustrates an alternative client-server system that uses placeholder objects.

FIG. 1B illustrates an alternative client-server system 100, where the client includes a data object model implementation (a DOM or DOM implementation) 125 that can manage data structures that include placeholder objects. The DOM 125 defines a data structure for representing the partial structure of data objects, a model of how the client can operate on the partial structure of data objects, and an interface for accessing and manipulating the data objects in the partial structure of data objects. The DOM implementation 125 receives the partial structure of data objects 120 and stores it. The DOM implementation 125 implements the conventional DOM interface functions. A client application 130 accesses and manipulates the data objects in the partial structure of data objects using the DOM interface functions. The client application is not aware of the placeholder objects and operates on the partial structure of data objects 120 as if it were the complete structure of data objects 115. If the client application requests access to a data object that is represented by a placeholder object, the DOM implementation 125 transmits a placeholder substitution request for content represented by that placeholder object to the server. The DOM implementation replaces the placeholder object with the content that is received from the server in response to the placeholder substitution request. The DOM implementation responds to the client application's request after the requested data object is available at the client.

Figure 2:
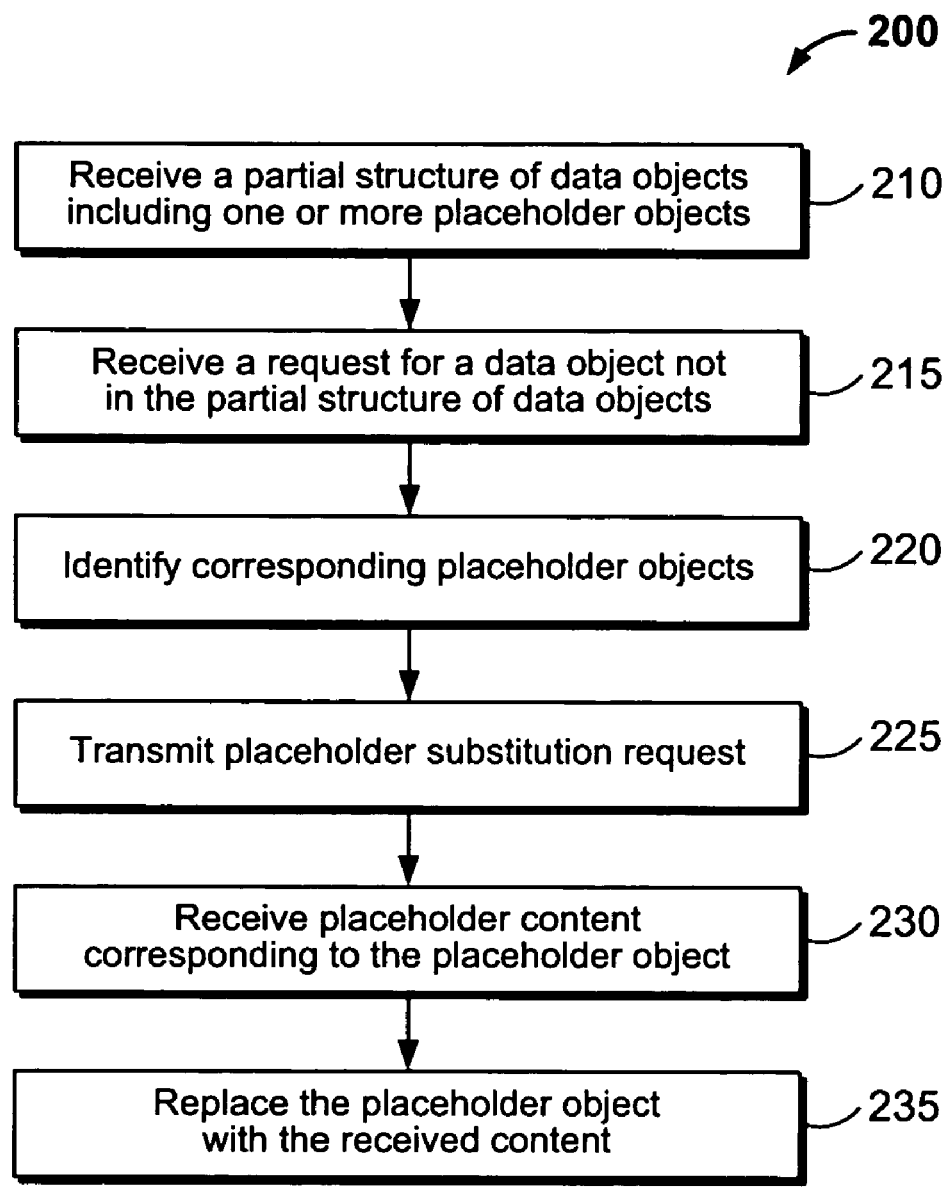
FIG. 2 is a flow diagram illustrating a method for using placeholder objects at the client.

FIG. 2 is a flow diagram illustrating a method 200 for using placeholder objects at the client 110. The client receives a partial structure of data objects 120 from the server (step 210), in response to a request for a complete structure of data objects 115. The partial structure of data objects 120 includes one or more placeholder objects. A request is made on the client for one or more data objects that are not in the partial structure of data objects 120 (step 215), e.g., as a result of user interaction at the client requesting access to one or more omitted data objects. The client identifies one or more placeholder objects that corresponds to the omitted data objects being requested (step 220), and sends a placeholder substitution request to the server identifying those placeholder objects (step 225). In response, the client receives placeholder content represented by the placeholder objects (step 230) and replaces the placeholder objects in the partial structure of data objects 120 (step 235) with the received content. The received content can be partial, i.e., including one or more placeholder objects, or complete.

Figure 3:
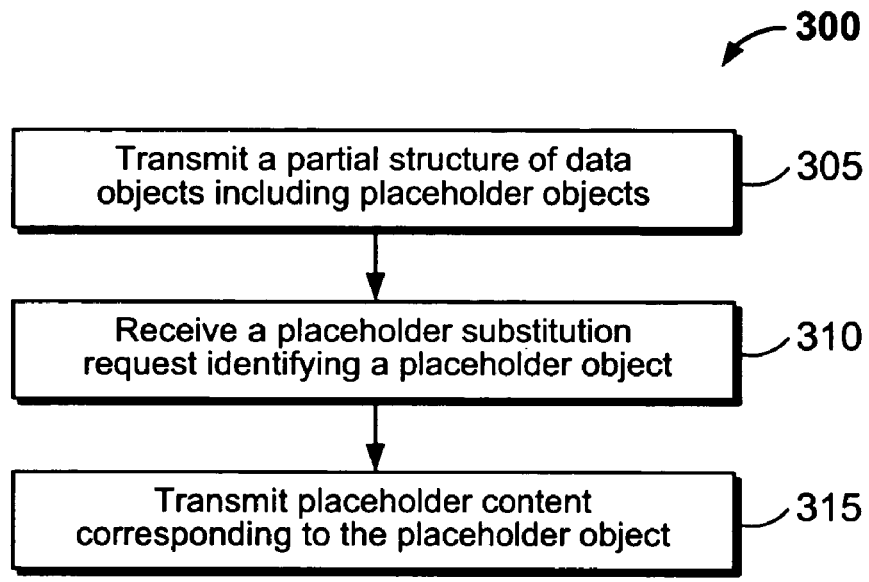
FIG. 3 is a flow diagram illustrating a method for using placeholder objects at the server.

FIG. 3 is a flow diagram illustrating a method 300 for using placeholder objects at the server 105. The server transmits a partial structure of data objects 120 in response to a request for a complete structure of data objects 115 (step 305). The partial structure of data objects 120 includes one or more placeholder objects. The server maintains a definition for each placeholder object sent to the client for which substitution content has not be sent. The server receives a placeholder substitution request identifying a placeholder object (step 310), and transmits placeholder content represented by the placeholder object in response to the request (step 315). In one implementation, the server stores the placeholder content associated with each placeholder object when it transmits the partial structure of data objects. In an alternative implementation, the server generates the content represented by the requested placeholder object after it receives the placeholder substitution request.

Figure 4:
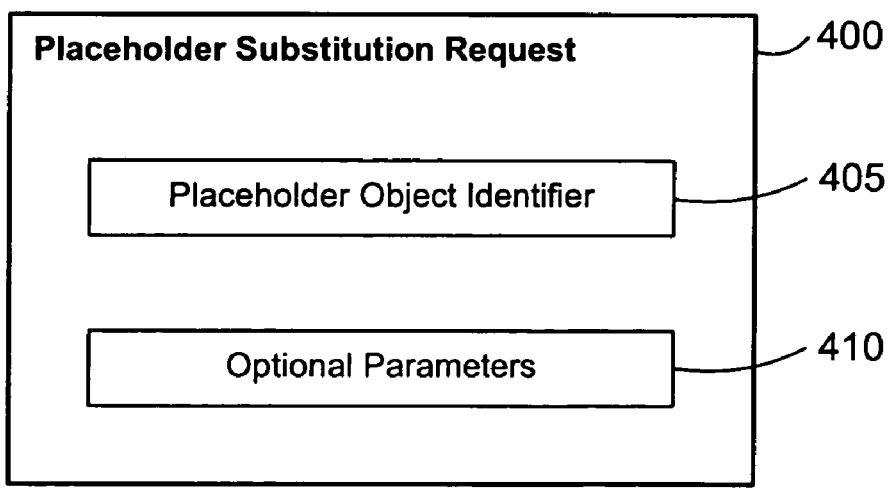
FIG. 4 is a block diagram illustrating one implementation of a placeholder substitution request.

FIG. 4 is a block diagram illustrating one implementation of the placeholder substitution request 400. The placeholder substitution request 400 includes a placeholder object identifier 405 and one or more optional parameters 410. The placeholder object identifier 405 identifies the placeholder object for which data is being requested from the server. In one implementation, the placeholder object identifier is a token that was included by the server in the placeholder object and that uniquely identifies the placeholder object to the server. In an alternative implementation, the placeholder object identifier is a unique identifier that identifies the location of the placeholder object in the structure of the partial structure of data objects stored at the client, e.g., a full path name for the placeholder object in the structure. The optional parameters for the placeholder substitution request can include parameters that are used by the server to determine an appropriate response to the placeholder substitution request. In one implementation, the client can specify the maximum number of data objects to be transmitted in response to the placeholder substitution request. In an alternative implementation, the client can specify optional parameters such as available bandwidth for the client-server communication. The server can use the optional parameters to determine the number of data objects to be sent to the client in response to the placeholder event. If some data objects are omitted from the response, their place will be taken by further placeholder objects.

In one implementation, the data objects are structured user interface (UI) elements that include specified relationships between the UI elements. The client initially receives and displays an incomplete UI using the partial structure of data objects 120 that is transmitted by the server. When the client receives user input accessing a missing UI element, i.e., one that is not included in the partial structure, the client uses a placeholder object corresponding to the missing UI element to request the missing UI element, and generally other UI elements in a common substructure, from the server. In one implementation, the structured UI elements represent a UI tree and the client initially receives and displays an incomplete UI tree using the partial structure of data objects that is transmitted by the server. In an alternative implementation, the structured UI elements can represent a table of UI elements including a number of rows. The client initially receives and displays a proper subset of the rows represented by the partial set of data objects. A user can display additional rows of the table by scrolling up or down in the table using a scroll bar provided by the UI. The client generates a placeholder substitution request for a missing data object whenever a request is received for a missing data object as a result of user interaction with the scroll bar. In other implementations, the structured UI elements represent a tab strip or pull down menus, and the client initially receives a partial set of data objects representing a proper subset of the tab strips or pull down menus. The client generates a placeholder substitution request whenever a request is received for a missing data object that is not in the proper subset of the tab strips or pull down menus available at the client. In an alternative implementation, the data objects implement different data types, and the structure specifies the relationship between the data types, one or more values for each data type, and one or more attributes for each data type.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The invention has been described in terms of particular embodiments, but other embodiments can be implemented and are within the scope of the following claims. For example, the operations of the invention can be performed in a different order and still achieve desirable results. Other embodiments are within the scope of the following claims

What is claimed is:

1. A client-server system comprising:
a server operable to:
receive from a client, over a network, a request for a structure comprising data objects;
receive, from the client, an available bandwidth for client-server communication over the network;
prepare a partial structure of data objects, the partial structure differing from the requested structure in that the partial structure comprises a first subset of the data objects comprising the requested structure and one or more placeholder objects in place of a second subset of the data objects comprising the requested structure, thereby omitting the second subset of data objects comprising the requested structure from the partial structure; and
transmit the partial structure over the network to the client in place of the requested structure,
wherein:
the placeholder objects have positions in the partial structure corresponding to positions of the omitted second subset of data objects in the requested structure,
the placeholder objects in the partial structure require less bandwidth to transmit than the omitted second subset of data objects, and
the server varies the number of placeholder objects and the number of data objects in the partial structure to conform the bandwidth required to transmit the partial structure over the network to the available bandwidth received from the client.

2. The system of claim 1, further comprising:
the client, the client being operable to accept the partial structure of data objects instead of the requested structure, the client being operable to transmit a placeholder substitution request to the server identifying one of the placeholder objects in the partial structure and to receive in response to the placeholder substitution request a further structure of data objects to replace the identified placeholder object.

3. The system of claim 1, wherein:
the server is further operable to respond to a placeholder substitution request identifying a placeholder object with a further structure of data objects to replace the identified placeholder object in the partial structure.

4. The system of claim 3, wherein the further structure of data objects is partial and contains one or more placeholder objects and omits one or more data objects.

5. The system of claim 2, wherein:
the client implements a data object model, the data object model defining a data structure for representing the partial structure of data objects, and an interface for operating on the partial structure of data objects.

6. The system of claim 5, wherein the data objects represent user interface elements, and the data object model is a user interface object model.

7. The system of claim 5, wherein the data objects represent data types, and the data object model is a data type object model.

8. The system of claim 5, wherein the data object model is an XML document object model.

9. A computer program product, tangibly embodied in a computer-readable storage device, the computer program product comprising instructions operable to cause a server to:
receive from a client, over a network, a request for a structure comprising data objects;
receive, from the client, an available bandwidth for client-server communication over the network;
prepare a partial structure of data objects, the partial structure differing from the requested structure in that the partial structure comprises a first subset of the data objects comprising the requested structure and one or more placeholder objects in place of a second subset of the data objects comprising the requested structure, thereby omitting the second subset of data objects comprising the requested structure from the partial structure; and
transmit the partial structure over the network to the client in place of the requested structure,
wherein:
the placeholder objects have positions in the partial structure corresponding to positions of the omitted second subset of data objects in the requested structure,
the placeholder objects in the partial structure require less bandwidth to transmit than the omitted second subset of data objects, and
the server varies the number of placeholder objects and the number of data objects in the partial structure to conform the bandwidth required to transmit the partial structure over the network to the available bandwidth received from the client.

10. The computer program product of claim 9, further comprising instructions operable to cause data processing apparatus to:

receive a placeholder substitution request identifying a first one of the placeholder objects; and
transmit placeholder content represented by the first placeholder object.

11. A method comprising steps implemented by a server of:
receiving from a client, over a network, a request for a structure comprising data objects;
receiving, from the client, an available bandwidth for client-server communication over the network;
preparing a partial structure of data objects, the partial structure differing from the requested structure in that the partial structure comprises a first subset of the data objects comprising the requested structure and one or more placeholder objects in place of a second subset of the data objects comprising the requested structure, thereby omitting the second subset of data objects comprising the requested structure from the partial structure; and
transmitting the partial structure over the network to the client in place of the requested structure,
wherein:
the placeholder objects have positions in the partial structure corresponding to positions of the omitted second subset of data objects in the requested structure,
the placeholder objects in the partial structure require less bandwidth to transmit than the omitted second subset of data objects, and
the server varies the number of placeholder objects and the number of data objects in the partial structure to conform the bandwidth required to transmit the partial structure over the network to the available bandwidth received from the client.

12. The method of claim 11, further comprising:
receiving a placeholder substitution request identifying a first one of the placeholder objects; and
transmitting placeholder content represented by the first placeholder object.

13. The method according to claim 12, wherein the placeholder objects sent in response to the request contain a placeholder object identifier that uniquely identifies the placeholder object.

14. A client-server system comprising:
a server operable to:
receive from a client, over a network, a request for a structure comprising data objects;
receive, from the client, a specified maximum number of data objects to transmit in response to the request;
prepare a partial structure of data objects, the partial structure differing from the requested structure in that the partial structure comprises a first subset of the data objects comprising the requested structure and one or more placeholder objects in place of a second subset of the data objects comprising the requested structure, thereby omitting the second subset of data objects comprising the requested structure from the partial structure; and
transmit the partial structure over the network to the client in place of the requested structure,
wherein:
the placeholder objects have positions in the partial structure corresponding to positions of the omitted second subset of data objects in the requested structure,
the placeholder objects in the partial structure require less memory capacity than the omitted second subset of data objects, and
the server varies the number of placeholder objects and the number of data objects in the partial structure to conform the number of data objects in the partial structure transmitted over the network to the client-specified maximum number.

15. A computer program product, tangibly embodied in a computer-readable storage device, the computer program product comprising instructions operable to cause a server to:

receive from a client, over a network, a request for a structure comprising data objects;

receive, from the client, a specified maximum number of data objects to transmit in response to the request;

prepare a partial structure of data objects, the partial structure differing from the requested structure in that the partial structure comprises a first subset of the data objects comprising the requested structure and one or more placeholder objects in place of a second subset of the data objects comprising the requested structure, thereby omitting the second subset of data objects comprising the requested structure from the partial structure; and transmit the partial structure over the network to the client in place of the requested structure, wherein:

the placeholder objects have positions in the partial structure corresponding to positions of the omitted second subset of data objects in the requested structure, the placeholder objects in the partial structure require less memory capacity than the omitted second subset of data objects, and the server varies the number of placeholder objects and the number of data objects in the partial structure to conform the number of data objects in the partial structure transmitted over the network to the client-specified maximum number.

16. A method comprising steps implemented by a server of:

receiving from a client, over a network, a request for a structure comprising data objects;

receiving, from the client, a specified maximum number of data objects to transmit in response to the request;

preparing a partial structure of data objects, the partial structure differing from the requested structure in that the partial structure comprises a first subset of the data objects comprising the requested structure and one or more placeholder objects in place of a second subset of the data objects comprising the requested structure, thereby omitting the second subset of data objects comprising the requested structure from the partial structure; and transmitting the partial structure over the network to the client in place of the requested structure, wherein:

the placeholder objects have positions in the partial structure corresponding to positions of the omitted second subset of data objects in the requested structure, the placeholder objects in the partial structure require less memory capacity than the omitted second subset of data objects, and the server varies the number of placeholder objects and the number of data objects in the partial structure to conform the number of data objects in the partial structure transmitted over the network to the client-specified maximum number.

* * * * *

UNITED STATES PATENT AND TRADEMARK OFFICE
CERTIFICATE OF CORRECTION

| | | |
|---|---|---|
| PATENT NO. | : 7,584,193 B2 | Page 1 of 1 |
| APPLICATION NO. | : 11/015616 | |
| DATED | : September 1, 2009 | |
| INVENTOR(S) | : Rolf Krane | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 375 days.

Signed and Sealed this

Twenty-eighth Day of September, 2010

David J. Kappos
*Director of the United States Patent and Trademark Office*